Oct. 20, 1959 E. C. HOYE ET AL 2,909,380
THREADED JOINT FOR TUBULAR PRODUCTS
Filed April 16, 1958 2 Sheets-Sheet 1
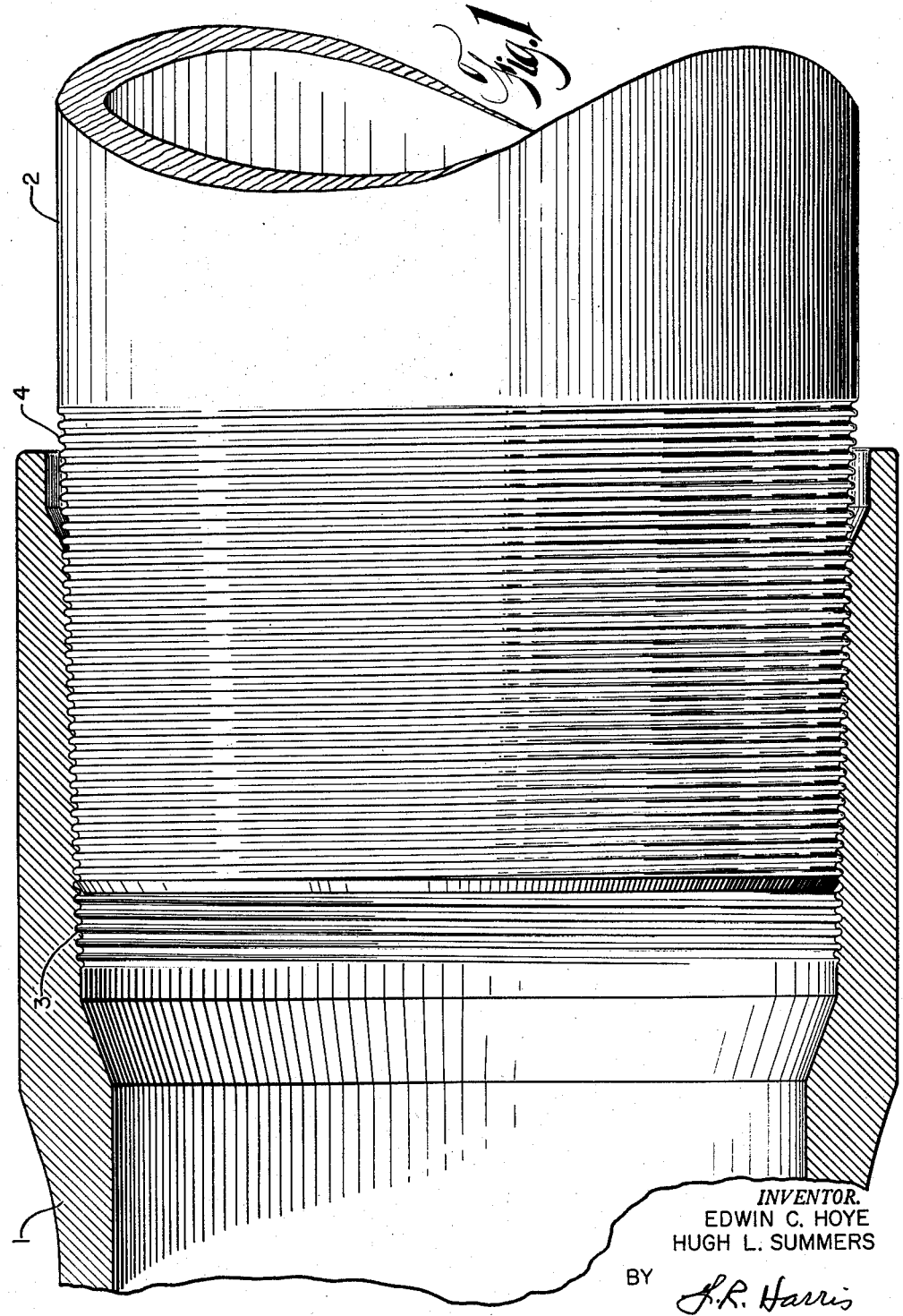
INVENTOR.
EDWIN C. HOYE
HUGH L. SUMMERS
BY
J.R. Harris
ATTORNEY

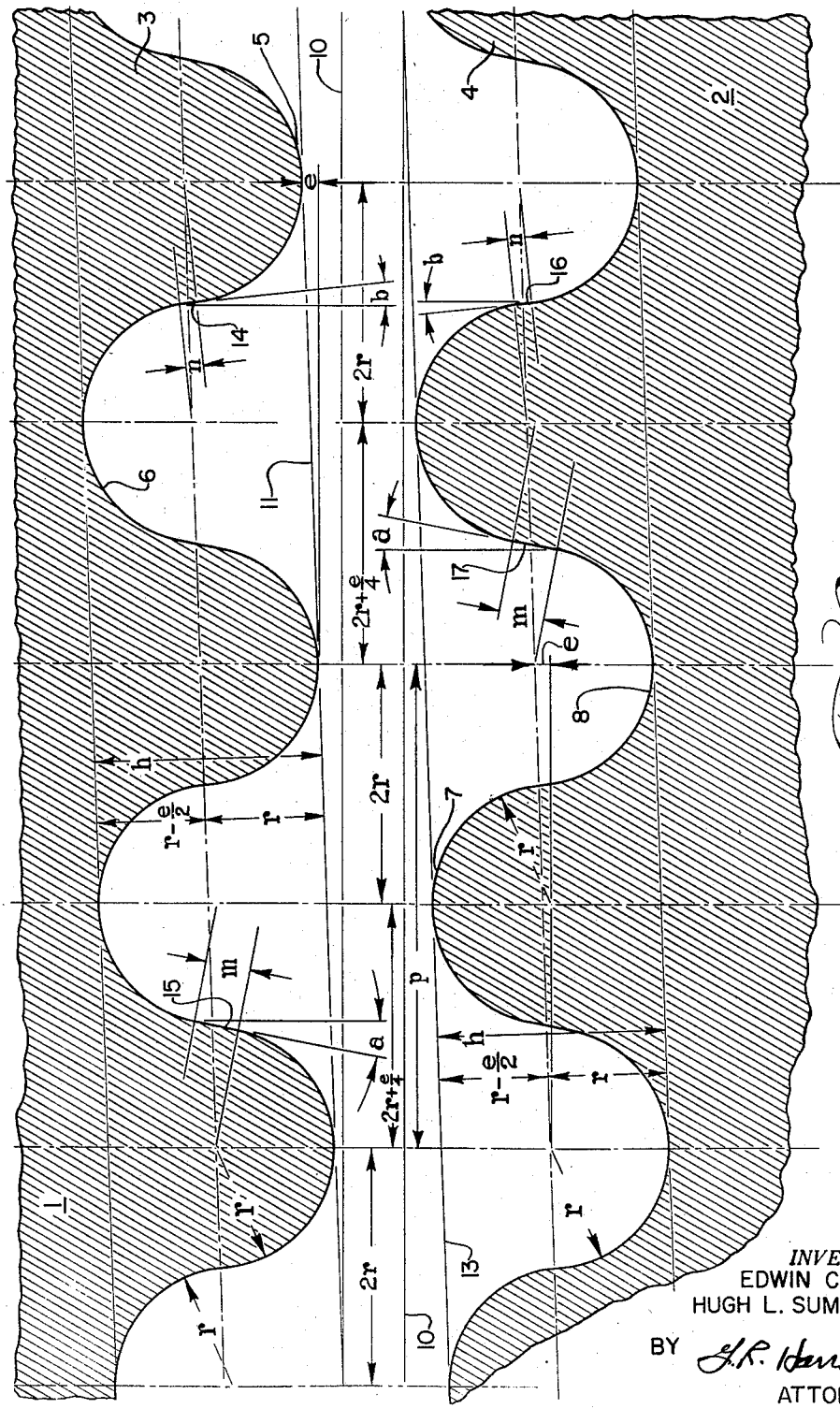

United States Patent Office 2,909,380
Patented Oct. 20, 1959

2,909,380

THREADED JOINT FOR TUBULAR PRODUCTS

Edwin C. Hoye, New Castle, and Hugh L. Summers, Sewickley, Pa.

Application April 16, 1958, Serial No. 730,744

1 Claim. (Cl. 285—333)

This invention is concerned with a joint for pipe or like tubular products and pertains more particularly to a tapered threaded joint for such products. This application is a continuation-in-part of our application Serial No. 547,768 filed November 18, 1955 now abandoned.

Coupled tubular products used in the production and distribution of oil are in some instances required to carry substantial loads in tension and to maintain seals effective at considerable pressures. Threaded joints are almost universally used for such couplings. Unfortunately, the thread forms which provide for the greatest mechanical load-carrying capacity do not seal too effectively and, vice versa, the forms of threads which provide effective seals do not usually develop high tensile strength.

It is an object of our invention, therefore, to provide a threaded joint for tubular products which exhibits high pull-out strength and at the same time provides a seal effective at high pressures. It is another object of our invention to provide such a joint which can be manufactured with conventional tools. Other objects of our invention will appear in the course of the following description thereof.

We have found that excellent load-carrying capacity and pressure sealing are properties of a threaded joint employing an asymmetrical tapered thread consisting in profile of crests and valleys which are arcs of circles connected on the tensile load-carrying faces by tangents substantially perpendicular to the joint axis. The tangents connecting the arcs on the other faces are inclined to perpendiculars to the joint axis. These properties are not what might be expected from the teachings of the art. Although it is common to round off the crests and valleys of V threads and to some extent, the corners of buttress and square threads, round threads have not heretofore been used in high strength joints because when subjected to tensile forces they develop a considerable radial component tending to collapse the pin or burst the box end.

The contour of our thread consists principally of circular arcs but includes flat portions of unequal length asymmetrically disposed between crests and valleys. Strings of coupled lengths of pipe by their nature are suitable for supporting load in tension only. When the tension on a threaded joint is gradually increased, the joint eventually fails by pulling out—that is, the pin end collapses or the box end expands sufficiently to allow the threaded portions to disengage from each other. We have found that the pull-out strength of rounded threads can be considerably increased by modifying the thread profile to include a flat portion on the load-carrying face which is small in extent but disposed substantially perpendicular to the pipe axis. We have also found that if rounded threads are cut in the form of circular arcs, they can be made to exhibit excellent sealing properties and that those properties are not degraded by flat portions on the thread flanks if the thread is tapered and the flat portions disposed as hereinafter described.

Conventional threading machines employ chasers which are contoured to cut several adjoining threads at once and those chasers are advanced into the work perpendicular to its axis. The thread of our joint although tapered is adapted to be cut on conventional machines in the conventional way.

A present preferred embodiment of our invention is shown in the attached figures, to which references is now made. Fig. 1 is a cross section through a joint of our invention. Fig. 2 is an enlarged profile of the mating male and female threads of Fig. 1.

In Fig. 1 a box end 1 of a pipe is provided with a female or internal tapered helical thread 3 having substantially semi-circular crests and valleys and a pin end 2 is provided with an exterior or male tapered helical mating thread 4 which is substantially complementary to female thread 3. The joint shown in Fig. 1 is of the integral type but it will be understood that our invention is equally applicable to a joint embodying a separate coupling adapted to receive identical threaded ends of the pipes or other tubular elements to be coupled.

In Fig. 2 the female threads 3 consist of successive crests 5, each of which is an arc slightly less than a semi-circle and successive valleys 6 of the same form. Adjoining crests and valleys are connected by straight lines 14 and 15, respectively, each of which is tangent to circular arcs 5 and 6. Tangent 15 which carries no tensile load is longer than tangent 14 of each thread, respectively.

Male thread 4 is likewise composed of successive crests 7 and valleys 8, each of which is an arc slightly less than a semi-circle connected by tangents 16 and 17, respectively. Tangent 17 is equal in length to tangent 15 and tangent 16 is equal to tangent 14. Line 10 is a line parallel to the axis of the pipes 1 and 2; line 11 is the tangent to the crests 5 of thread 3, and line 13 is the tangent to the crests 7 of thread 4.

For convenience, certain parameters of the thread profile are indicated by letters as follows:

$r$ = radius of circular arcs 5, 6, 7 and 8
$m$ = length of lines 15 and 17
$n$ = length of lines 14 and 16
$h$ = depth of thread
$a$ = angle of inclination of lines 15 and 17 to diameter of pipe
$b$ = angle of inclination of lines 14 and 16 to diameter of pipe
$p$ = pitch
$e$ = taper on pipe radius over pitch.

The pitch of the thread is defined as the distance between successive crests or valleys. The taper $e$, as defined above, is quite small compared to $r$ or $p$. We find that our joint exhibits excellent properties if $r$ is approximately $p/4$ and $h$ is approximately $p/2$. More precisely, $p$ equals $4r + e/4$ and $h$ equals $2r - e/2$. The centers of circular arcs 5, 6, 7 and 8 do not quite bisect either the pitch or the depth of the thread because of the allowance which must be made for taper. In the thread profile resulting $m$ is greater than $n$, as has been mentioned, but is much smaller than $r$, and $a$ is greater than $b$ but is only a few degrees. The relation of the various parameters above-mentioned to the thread profile of our joint is graphically shown in Fig. 2.

Tangents 14 and 16 on the load-carrying face of the thread are substantially perpendicular to the joint axis. We do not find it necessary that these tangents be precisely perpendicular, and it would be commercially impractical to maintain zero tolerances in any event. It is impossible with the conventional chasers and threading machines previously mentioned to cut threads having tangent portions 14 and 16 inclined on the other side of the perpendicular to the joint axis from that shown in Fig. 2 and normal tolerances are such that angle $b$ will be greater than zero by a few degrees. We prefer to specify $b$, the angle of inclination of those tangents to the perpendicular as 6°, which angle, plus or minus commercial tolerances of about 2°, we consider substantially perpendicular to the joint axis. When the depth of our thread is substantially half of the pitch, tangent portions 14 and 16 inclined at about 6° to the perpendicular provide sufficient flat contact to impart desirable high pull-out strength to our threaded joint.

Tangent portions 15 and 17 on the non-load-carrying face do not contribute directly to the load-carrying capacity of our threaded joint. However, the frictional contact between the flat flanks of the threads represented in profile by those tangents does increase the pull-out strength of our joint to some extent by reducing the radially outwardly directed reaction component. On the other hand, it is more difficult to hold those tangent portions to the tolerances necessary for good sealing properties than it is the circular arc portions, and we find that when the depth of our thread is substantially half the thread pitch $a$, the angle of inclination of tangent portions 15 and 17, is best held between about 10° and about 16°.

We have constructed and tested 7″ outside diameter casing made up in accordance with API specification N–80 except that it was provided with threads made according to our invention, eight threads to the inch on a taper of three-quarters of an inch per foot on diameter. We have also constructed and tested 2⅞″ externally upset tubing made up to the same API specification and provided with threads made according to our invention to the same pitch and taper as those of the casing. Joints of such casing exhibited pull-out strengths from 10 to 20% greater than the average of similar joints provided with API threads and withstood without leaking internal fluid pressures up to the value which exceeded the elastic limit of the material. Joints of such tubing withstood internal fluid pressures in excess of 10,000 pounds per square inch without leakage.

We claim:

A threaded joint comprising two cylindrical members having substantially complementary cooperating tapered threaded surfaces, the threads being of a depth substantially equal to one-half the thread pitch and having crests and valleys which in profile are arcs of circles of a radius substantially equal to one-quarter of the thread pitch, connected on the load-carrying flanks facing the smaller end of the tapered surfaces by small tangents to the arcs sloping outwardly toward the smaller end of the taper and which diverge from perpendiculars to the joint axis by an angle between about 4° and about 8° and on the non-load-carrying flanks by tangents to the arcs sloping inwardly toward the smaller end of the taper and which diverge from perpendiculars to the joint axis by an angle between about 10° and about 16°.

References Cited in the file of this patent

UNITED STATES PATENTS

| | | |
|---|---|---|
| 1,394,791 | Runyan | Oct. 25, 1921 |
| 1,671,579 | Greve | May 29, 1928 |
| 2,052,011 | Baker | Aug. 25, 1936 |
| 2,196,966 | Hammer | Apr. 9, 1940 |